(12) United States Patent
Koba et al.

(10) Patent No.: US 12,312,204 B2
(45) Date of Patent: May 27, 2025

(54) SHEET PROCESSING APPARATUS AND IMAGE FORMING APPARATUS INCORPORATING THE SHEET PROCESSING APPARATUS

(71) Applicants: Haruka Koba, Kanagawa (JP); Yuuta Hayashi, Tokyo (JP)

(72) Inventors: Haruka Koba, Kanagawa (JP); Yuuta Hayashi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 204 days.

(21) Appl. No.: 18/176,020

(22) Filed: Feb. 28, 2023

(65) Prior Publication Data

US 2023/0278819 A1    Sep. 7, 2023

(30) Foreign Application Priority Data

Mar. 4, 2022  (JP) ................ 2022-033862

(51) Int. Cl.
  B65H 7/06 (2006.01)
  B32B 37/00 (2006.01)
  B32B 41/00 (2006.01)

(52) U.S. Cl.
  CPC .......... B65H 7/06 (2013.01); B32B 37/0046 (2013.01); *B32B 2037/0061* (2013.01); *B32B 41/00* (2013.01); *B65H 2511/528* (2013.01); *B65H 2513/512* (2013.01); *B65H 2601/11* (2013.01); *B65H 2801/27* (2013.01)

(58) Field of Classification Search
  CPC ............ B32B 2037/0061; B32B 41/00; B32B 37/0046; B32B 2401/04; B65H 7/06; B65H 41/00; B65H 2511/528; B65H 2513/512; B65H 2601/11; B65H 2801/27; B65H 7/12
  See application file for complete search history.

(56) References Cited

U.S. PATENT DOCUMENTS 7,946,326 B2 *  5/2011  Lee .............. B65H 3/446
                                            156/367

FOREIGN PATENT DOCUMENTS

JP        2021-143072        9/2021

* cited by examiner

*Primary Examiner* — Jeremy R Severson
(74) *Attorney, Agent, or Firm* — IPUSA, PLLC (57) ABSTRACT

A sheet processing apparatus includes a sheet entrance portion, a post-processing device, and circuitry. The sheet entrance portion receives a sheet medium conveyed from an upstream apparatus. The post-processing device separates a two-ply sheet, inserts the sheet medium into the two-ply sheet, and performs a heating operation on the two-ply sheet in which the sheet medium is inserted. The circuitry causes the post-processing device to interrupt a post-processing operation, as one of a series of post-processing operations up to the heating operation, in response to an occurrence of an abnormal condition of the upstream apparatus, and resume the post-processing operation interrupted due to the abnormal condition of the upstream apparatus, in response to a recovery from the abnormal condition of the upstream apparatus.

8 Claims, 8 Drawing Sheets

SHEET PROCESSING APPARATUS AND IMAGE FORMING APPARATUS INCORPORATING THE SHEET PROCESSING APPARATUS

CROSS-REFERENCE TO RELATED APPLICATION

This patent application is based on and claims priority pursuant to 35 U.S.C. § 119(a) to Japanese Patent Application No. 2022-033862, filed on Mar. 4, 2022, in the Japan Patent Office, the entire disclosure of which is hereby incorporated by reference herein.

BACKGROUND

Technical Field

Embodiments of the present disclosure generally relate to a sheet processing apparatus and an image forming apparatus incorporating the sheet processing apparatus.

Background Art

A technique called lamination is known that a sheet medium is inserted into a two-ply sheet including two sheets whose one sides are separated for the sheet medium, and heat and pressure are applied to the two-ply sheet with the sheet medium being inserted to bond the one sides of the two sheets of the two-ply sheet. Further, various types of sheet processing apparatuses in the art are known that convey a sheet medium on which an on which an image is formed, insert the sheet medium into a two-ply sheet, and perform a sheet laminating operation. Furthermore, various types of image forming apparatuses in the art are know that form an image on the sheet medium in cooperation with the sheet processing apparatus.

A sheet processing apparatus in the art having a technique applicable to an image forming system in which lamination is performed includes two sheet processing passages. When the sheet laminating operation is performed on an output object, another output object that does not require lamination is conveyed and ejected from the sheet processing apparatus via one of the two sheet processing passages.

SUMMARY

Embodiments of the present disclosure described herein provide a novel sheet processing apparatus including a sheet entrance portion, a post-processing device, and circuitry. The sheet entrance portion receives a sheet medium conveyed from an upstream apparatus. The post-processing device separates a two-ply sheet, inserts the sheet medium into the two-ply sheet, and performs a heating operation on the two-ply sheet in which the sheet medium is inserted. The circuitry causes the post-processing device to interrupt a post-processing operation, as one of a series of post-processing operations up to the heating operation, in response to an occurrence of an abnormal condition of the upstream apparatus, and resume the post-processing operation interrupted due to the abnormal condition of the upstream apparatus, in response to a recovery from the abnormal condition of the upstream apparatus.

Further, embodiments of the present disclosure described herein provide an image forming apparatus including an image former that forms an image on a sheet, and the above-described sheet processing apparatus attached to the image forming apparatus and to perform a post-processing operation on the sheet.

Further, embodiments of the present disclosure described herein provide an image forming apparatus including an image forming apparatus that forms an image on a sheet medium, and the above-described sheet processing apparatus attached to the image forming apparatus and to perform a post-processing operation on the sheet medium.

BRIEF DESCRIPTION OF THE SEVERAL VIEWS OF THE DRAWINGS

Exemplary embodiments of this disclosure will be described in detail based on the following figures, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 1:
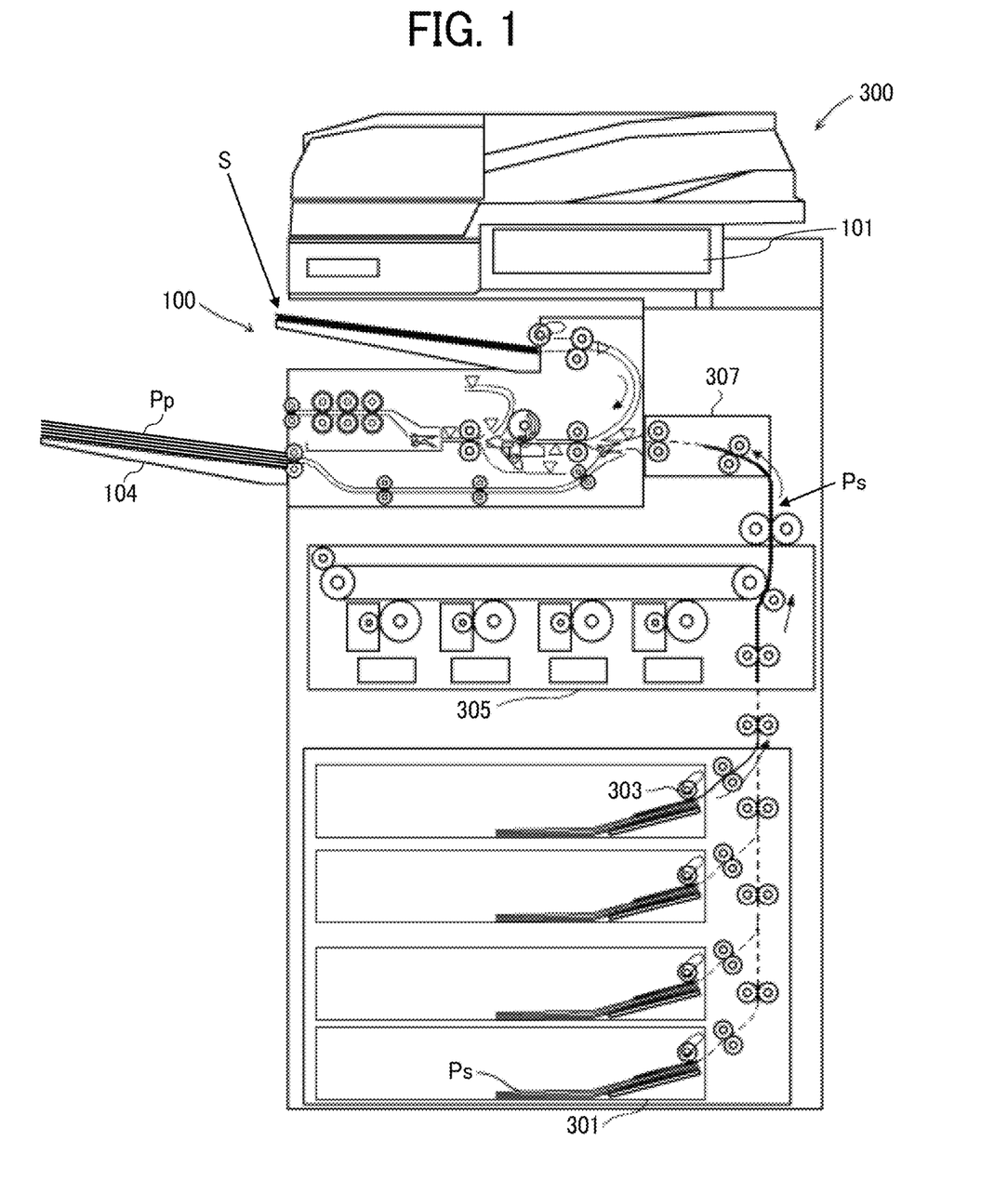
FIG. 1 is a schematic diagram illustrating a configuration of an image forming apparatus including a sheet processing apparatus, according to an embodiment of the present disclosure.

A description is given of an image forming operation performed by an image forming apparatus according to an embodiment of the present disclosure, with reference to FIG. 1.

FIG. 1 is a schematic diagram illustrating the overall configuration of an image forming apparatus 300 according to an embodiment of the present disclosure.

The image forming apparatus 300 includes a sheet laminator 100 serving as a sheet processing apparatus according to an embodiment of the present disclosure.

Details of the sheet laminator 100 are described below.

The sheet laminator 100 is a sheet processing apparatus in which two sheets of a two-ply sheet (hereinafter, a two-ply sheet S) are separated from each other, an inner sheet P serving as a sheet medium is inserted into the two-ply sheet S, in other words, between the two sheets separated from each other, the inner sheet P is held between the two sheets of the two-ply sheet S, the sheet laminating operation is performed on the two-ply sheet S in which the inner sheet P is inserted, and the two-ply sheet S is output.

The two-ply sheet S includes two sheets whose one parts (or one sides) are bonded together. For example, one sheet is a transparent sheet such as transparent polyester sheet and the other sheet is a transparent sheet or a translucent sheet, and these two sheets are bonded together at the one sides. The two-ply sheet S also includes a lamination film.

The inner sheet P is, for example, a sheet medium that is inserted into the two-ply sheet S. The inner sheet P may be, for example, plain paper, thick paper, postcards, envelopes, thin paper, coated paper, art paper, tracing paper, and overhead projector (OHP) transparencies.

In the description below, a medium that is inserted into the two-ply sheet S and receives the sheet laminating operation is referred to as an "inner sheet P". In the description below, a sheet medium that is output without being inserted into the two-ply sheet S and receiving the sheet laminating operation is referred to as a "sheet Pp". When the inner sheet P and the sheet Pp are not distinguished from each other, the inner sheet is referred to as a "sheet Ps".

The image forming apparatus 300 further includes sheet containers 301, a sheet feeding member 303, an image forming device 305, and a sheet ejection passage 307. Each of the sheet containers 301 accommodates and supplies the sheet Ps in the lower part of the image forming apparatus 300. The sheet feeding member 303 feeds the sheet Ps from any one of the sheet container 301. The image forming device 305 serving as an image former is disposed above the uppermost sheet container 301 of the sheet containers 301 and forms an image on the sheet Ps. The sheet ejection passage 307 ejects the sheet Ps on which an image is formed, toward the sheet laminator 100. The sheet laminator 100 is disposed downstream from the image forming apparatus 300 in a sheet conveyance direction in which the sheet Ps is conveyed. The sheet Ps that travels in the image forming apparatus 300 is delivered to the inside of the sheet laminator 100 at an inner sheet delivery guide 117 serving as a sheet entrance portion of the sheet laminator 100.

The sheet laminator 100 starts the sheet separating operation of the two-ply sheet S simultaneously with the start of the image forming operation (printing process) in the image forming apparatus 300. When the sheet Ps (inner sheet P) is delivered from the image forming apparatus 300, the two-ply sheet S in which the two sheets are separated from each other is ready to receive the inner sheet P. The image forming apparatus 300 starts feeding the sheet Ps from the sheet container 301 simultaneously with the start of the sheet separating operation of the two-ply sheet S, and delivers the sheet Ps to the inner sheet delivery guide 117 of the sheet laminator 100 via the sheet ejection passage 307. In this series of operations, the image forming device 305 may perform the image forming operation to form an image on the sheet Ps before the sheet Ps is delivered to the sheet laminator 100 or may deliver the sheet Ps without performing the image forming operation.

The image forming apparatus 300 may include a main ejection passage and a main ejection tray above the sheet ejection passage 307 illustrated in FIG. 1. By so doing, even when the sheet laminating operation is not performed on the sheet Ps, the sheet Ps (sheet Pp) can be ejected from the image forming apparatus 300. With such a configuration, when an output object (sheet Pp) that does not require the sheet laminating operation is output from the image forming apparatus 300, the sheet Pp can be ejected without passing through the sheet laminator 100. As a result, the output object can be output efficiently without reducing the output speed of the image forming apparatus 300.

Embodiment of Sheet Processing Apparatus

Figure 2:
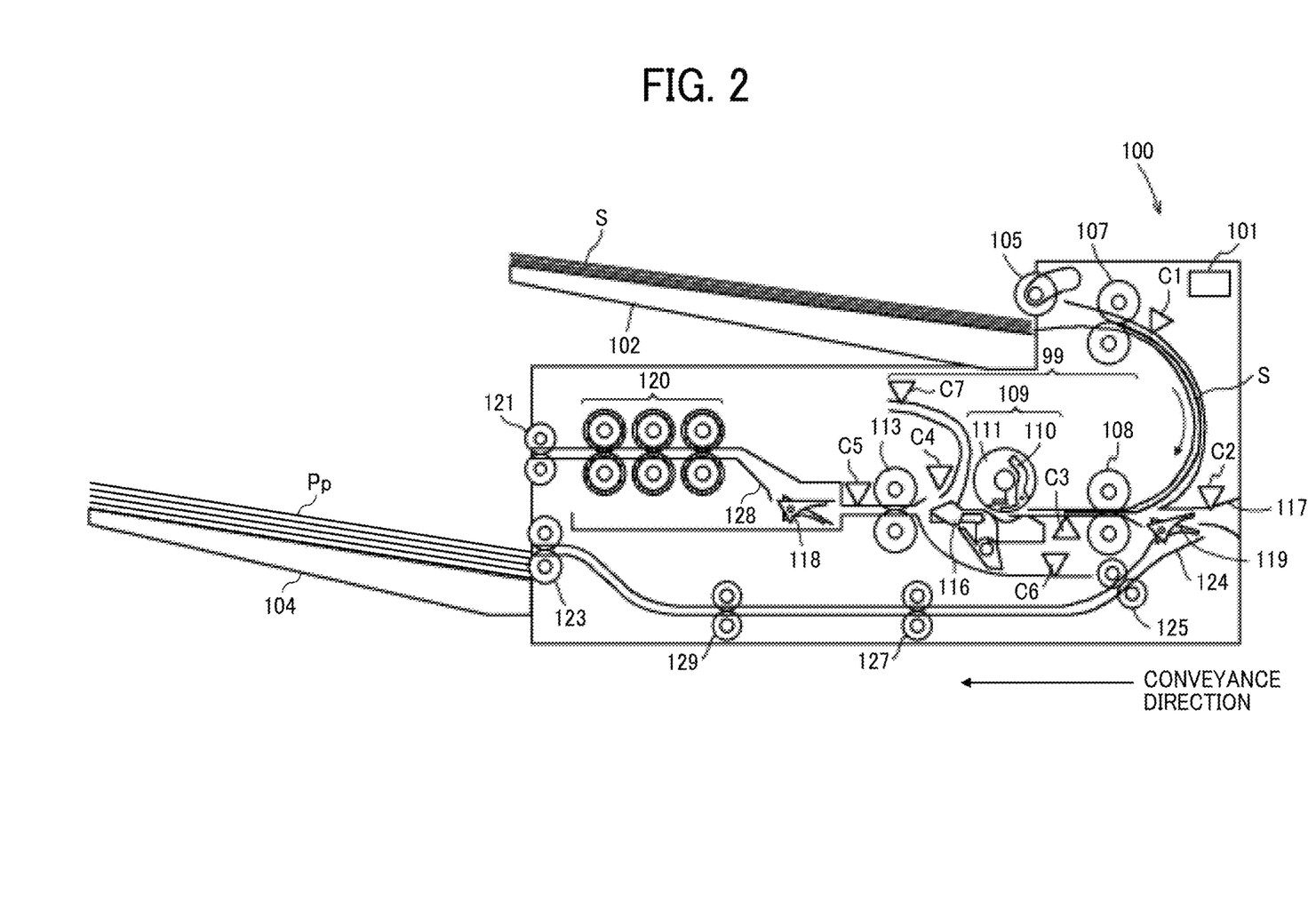
FIG. 2 is a diagram illustrating an overall configuration of the sheet processing apparatus according to an embodiment of the present disclosure.

A description is given of the sheet laminator 100 serving as a sheet processing apparatus according to an embodiment of the present disclosure, with reference to FIG. 2.

FIG. 2 is a diagram illustrating an overall configuration of the sheet processing apparatus according to an embodiment of the present disclosure.

As described above, the image forming apparatus 300 includes the image forming device 305 that performs the image forming operation on the sheet, and the sheet laminator 100 that performs a post-processing operation on the sheet Ps (inner sheet P) on which an image is formed. As an image forming system 1 described below, the sheet laminator 100 may be disposed separate from the image forming apparatus 300.

The sheet laminator 100 is provided with a first sheet conveyance passage through which the inner sheet P is conveyed for the post-processing operation and a second sheet conveyance passage through which the sheet Pp on which no post-processing operation is performed is conveyed toward the downstream side in the sheet conveyance direction. When a plurality of print jobs including a print job of one copy or N copies (N≥2) for the sheet laminating operation in the sheet laminator 100 and another print job for no sheet laminating operation in the sheet laminator 100 are indicated, while an M-th copy of the print job (1≤M<N) for the sheet laminating operation, the print job without the sheet laminating operation is performed and the sheet is conveyed in the second sheet conveyance passage.

As illustrated in FIG. 2, the sheet laminator 100 includes a sheet tray 102, a pickup roller 105, and a conveyance roller pair 107. The sheet tray 102 serving as a first sheet stacker on which the two-ply sheet S is placed. The pickup roller 105 feeds the two-ply sheet S from the sheet tray 102. The inner sheet P can be fed from the sheet container 301 of the image forming apparatus 300. A desired image is printed on the inner sheet P to be inserted into the two-ply sheet S by a method utilizing a copier or a printer of the image forming apparatus 300, and the inner sheet P is insertable in an in-line manner.

A sheet conveyance sensor C1 is disposed downstream from the conveyance roller pair 107 in the sheet conveyance direction to detect the conveyance position of the two-ply sheet S. The inner sheet P fed from the image forming apparatus 300 (see FIG. 1) as a device disposed upstream from the sheet laminator 100 is delivered into the sheet laminator 100 by the inner sheet delivery guide 117 of the sheet laminator 100. A conveyance sensor C2 is disposed on the inner sheet delivery guide 117 to detect the conveyance position of the inner sheet P.

The sheet laminator 100 includes an entrance roller pair 108 as a first conveyor, a winding roller 109 as a rotator, the exit roller pair 113 as a second conveyor, and the sheet ejection tray 104 as a sheet stacker to stack two-ply sheet S ejected from the inside of the sheet laminator 100. The entrance roller pair 108, the winding roller 109, the exit roller pair 113, and the sheet ejection tray 104 are disposed downstream from the conveyance roller pair 107 in the sheet conveyance direction. The sheet laminator 100 further includes separation claws 116 between the winding roller 109 and the exit roller pair 113. The separation claws 116 are movable in the width direction of the two-ply sheet S.

A sheet conveyance sensor C3 is disposed downstream from the entrance roller pair 108 in the sheet conveyance direction to detect the conveyance position of the two-ply sheet S and the sheet conveyance position of the inner sheet P. An abnormal condition detection sensor C4 is disposed downstream from the winding roller 109 in the sheet conveyance direction to detect the condition of the two-ply sheet S. A sheet conveyance sensor C5 is disposed downstream from the exit roller pair 113 in the sheet conveyance direction to detect the conveyance position of the two-ply sheet S. A sheet separation sensor C6 that detects the lower sheet of the separated two sheets of the two-ply sheet S is disposed below the sheet conveyance sensor C3. A sheet separation sensor C7 that detects the upper sheet of the separated two sheets of the two-ply sheet S is disposed above the exit roller pair 113.

The entrance roller pair 108, the winding roller 109, the separation claws 116, and the exit roller pair 113 define a sheet processing passage 99 serving as a sheet conveyance passage for processing the two-ply sheet S. To be more specific, the sheet processing passage 99 is where the two-ply sheet S serving as a first medium is separated and the inner sheet P serving as a second medium is nipped between the separated two sheets of the two-ply sheet S. The inner sheet P has an image formed by the image forming device 305 that is disposed upstream from the sheet laminator 100 in the sheet conveyance direction. The sheet processing passage 99 may include a thermal pressure rollers 120 serving as a thermal pressure member that can apply heat and pressure to the two-ply sheet S. With such a configuration, the sheet processing apparatus can perform the sheet laminating operation including heating. Thus, another job can be performed using the sheet ejection passage during heating, thus enhancing the productivity of the entire system.

The sheet laminator 100 includes a branching claw 118 and a thermal pressure conveyance passage 128. The branching claw 118 is disposed downstream from the sheet processing passage 99 in the sheet conveyance direction. The thermal pressure conveyance passage 128 is provided downstream from the branching claw 118 in the sheet conveyance direction. The thermal pressure rollers 120 and a sheet ejection roller 121 disposed in proximity to the sheet ejection port of the sheet laminator 100 downstream from the thermal pressure rollers 120 in the sheet conveyance direction are disposed on the thermal pressure conveyance passage 128.

The thermal pressure rollers 120 serving as a thermal pressure member applies heat and pressure to the two-ply sheet S in which the inner sheet P is inserted. After the sheet laminating operation is performed on the two-ply sheet S, the two-ply sheet S is ejected from the sheet ejection port by the sheet ejection roller 121, and is then stacked on the sheet ejection tray 104.

The sheet laminator 100 further includes a sheet ejection passage 124 and a branching claw 119. The sheet ejection passage 124 allows the sheet Pp or the inner sheet P, which is a second sheet, to be ejected to the sheet ejection tray 104 without passing through the sheet processing passage 99. The branching claw 119 is disposed upstream from the sheet processing passage 99 in the sheet conveyance direction and serves as a switching member to switch the conveyance destination of the sheet Pp or the inner sheet P to the sheet ejection passage 124 or the sheet processing passage 99 in accordance with information of the sheet Pp or the inner sheet P. Conveyance rollers 125, 127, and 129 and a sheet ejection roller 123 are disposed on the sheet ejection passage 124. The conveyance rollers 125, 127, and 129 convey the sheet Pp or the inner sheet P. The sheet ejection roller 123 is disposed in proximity to the sheet ejection port. The sheet Pp or the inner sheet P ejected from the sheet ejection port by the sheet ejection roller 123 is ejected and stacked on the sheet ejection tray 104.

As described above, the sheet laminator 100 includes the sheet ejection passage 124 and the branching claw 119. The sheet ejection passage 124 allows a sheet to be ejected without passing through the sheet processing passage 99. The branching claw 119 is disposed upstream from the sheet processing passage 99 in the sheet conveyance direction and serves as a switching member to guide the sheet Pp or the inner sheet P to the sheet ejection passage 124. Such a configuration allows the inner sheet P requiring the sheet laminating operation to be guided to the sheet processing passage 99 and the sheet Pp not requiring the sheet laminating operation such as copying or printing to be guided to the sheet ejection passage 124, and the inner sheet P and the sheet Pp are ejected separately. Accordingly, even during sheet processing such as during the sheet feeding or separating operation of the two-ply sheet S in the sheet processing passage 99 or during sheet processing such as during the conveyance to the thermal pressure rollers 120 after the insertion or sheet processing of the inner sheet P, normal printing (a print job using, for example, a copier or a printer) in which the sheet Pp is ejected without performing the sheet laminating operation can be performed, thus enhancing the productivity of printing that does not require the sheet laminating operation.

The sheet laminator 100 has the branching claw 119 as a switching member to guide a sheet to the sheet processing passage 99 or the sheet ejection passage 124 on the upstream side from a conveyance passage merging point of the two-ply sheet S as the first sheet and the inner sheet P as the second sheet. Accordingly, even during the feeding of the two-ply sheet S in the sheet processing passage 99, a sheet subjected to copying or printing that does not require the sheet laminating operation can be guided to the sheet ejection passage 124 by the branching claw 119 and ejected to the sheet ejection tray 104.

A sheet processing operation panel 101 is provided on the exterior of the sheet laminator 100. The sheet processing operation panel 101 serves as a display-operation device to display information of the sheet laminator 100 and receive input of the operation of the sheet laminator 100. In addition, the sheet processing operation panel 101 also serves as a notification unit that issues a perception signal to the user. For example, when processing abnormal condition occurs in the sheet laminator 100, a notification sound for notifying the user of the processing abnormal condition is output. Moreover, at occurrence of the processing abnormal condition in the image forming apparatus 300, when the two-ply sheet S is held with the two sheets being separated from each other and the two-ply sheet S maintains a recyclable condition, a notification sound or display for notifying the user of the processing abnormal condition is output. As an alternative, the notification unit other than the sheet processing operation panel 101 may be separately provided in the sheet laminator 100.

Operations of Sheet Laminator 100

A description is given of the operations of each device or unit provided for the sheet laminator 100.

Each of the entrance roller pair 108 and the exit roller pair 113 is, for example, two rollers paired with each other and is driven by a drive unit such as a motor. The entrance roller pair 108 rotates in one direction. The exit roller pair 113 rotates in forward and reverse directions. By so doing, the two-ply sheet S and the inner sheet P are nipped and conveyed.

The entrance roller pair 108 conveys the two-ply sheet S and the inner sheet P toward the exit roller pair 113. On the other hand, the exit roller pair 113 can switch the direction of rotation between the forward conveyance direction and the reverse conveyance direction that is a direction opposite to the forward conveyance direction. The exit roller pair 113 can convey the two-ply sheet S nipped by the rollers of the exit roller pair 113 toward the sheet ejection tray 104 in the forward conveyance direction and also conveys the two-ply sheet S toward the winding roller 109 in the reverse conveyance direction (to convey the two-ply sheet S in reverse). The sheet conveyance direction of the two-ply sheet S toward the winding roller 109 (in other words, the reverse conveyance direction opposite to the forward conveyance direction) is hereinafter referred to as a reverse conveyance direction.

The sheet laminator 100 is provided with the winding roller 109 as a rotator and the separation claws 116 that are disposed between the entrance roller pair 108 and the exit roller pair 113. The winding roller 109 is driven by a drive unit such as a motor to rotate in the forward and reverse directions. The direction of rotation of the winding roller 109 can be switched between the forward conveyance direction (clockwise direction) and the reverse conveyance direction (counterclockwise direction).

The winding roller 109 includes a roller 111 and a sheet gripper 110 movably disposed on the roller 111 to grip the two-ply sheet S. The sheet gripper 110 that is movable grips the leading end of the two-ply sheet S between the sheet gripper 110 and the roller 111. The sheet gripper 110 may be formed on the outer circumference of the roller 111 as a single unit or may be formed as a separate unit.

Embodiment of Image Forming System

A description is given of the image forming system 1 including the similar functions as the image forming apparatus 300 and the sheet laminator 100 described above, with reference to FIG. 3.

Figure 3:
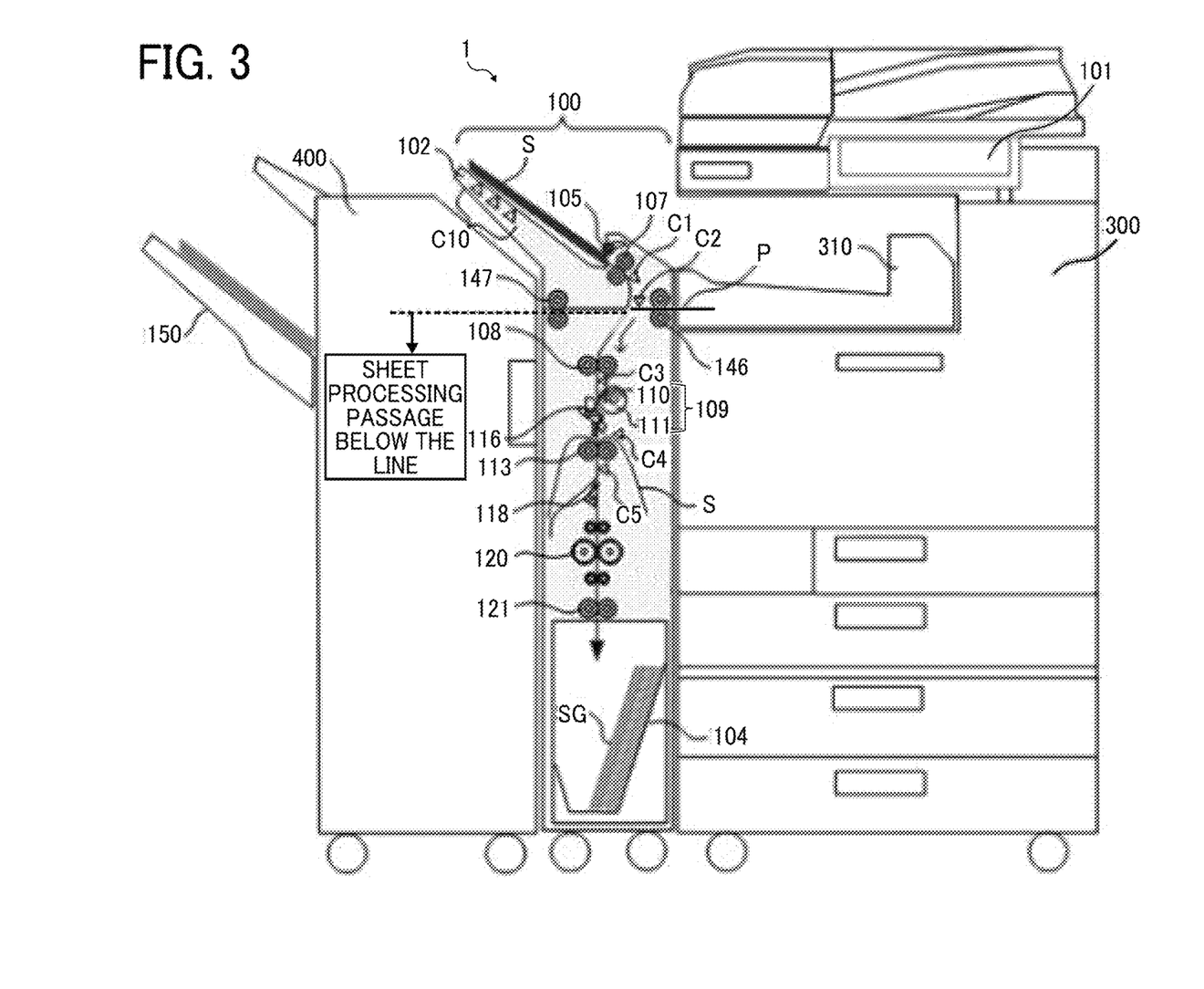
FIG. 3 is a diagram illustrating a schematic configuration of an image forming system including a sheet processing apparatus and an image forming apparatus, according to an embodiment of the present disclosure.

FIG. 3 is a diagram illustrating an overall configuration of the image forming system 1 according to an embodiment of the present disclosure.

As illustrated in FIG. 3, the image forming system 1 includes the image forming apparatus 300, a relay device 310, the sheet laminator 100, and a sheet laminator 400.

The image forming system 1 according to the present embodiment can feed the inner sheet P from the image forming apparatus 300 via the relay device 310 and insert any image in an in-line manner according to a method utilizing a copier or a printer. Thus, the image forming system 1 can perform a series of operations of, in this order, the feeding of the two-ply sheet S, the separation of the two-ply sheet S, the insertion of the inner sheet P, and the sheet laminating operation under heat and pressure without using manpower.

In the case of a print job in which sheet laminating operation is performed, the sheet laminator 100 feeds the two-ply sheet S from the sheet tray 102 on which two-ply sheets S are stacked, by a pickup roller 105 and a conveyance roller pair 107. The separated two-ply sheet S is held by the exit roller pair 113, receives the inner sheet P fed from the image forming apparatus 300 by an entrance roller pair 146, and merges with the two-ply sheet S by the entrance roller pair 108. Then, the sheet laminating operation is performed on the merged object including the two-ply sheet S and the inner sheet P under heating by the thermal pressure rollers 120. The laminated two-ply sheet S containing the inner sheet P (i.e., a processed sheet SG) is stacked on the sheet ejection tray 104 by the sheet ejection roller 121.

In the case of a print job in which the sheet laminating operation is not performed, the sheet fed from the image forming apparatus 300 is received by the entrance roller pair 146 of the sheet laminator 100 and conveyed to the sheet laminator 400 by a sheet ejection roller pair 147. The sheet laminator 400 is located downstream from the sheet laminator 100 in the sheet conveyance direction, and the sheet ejection roller pair 147 is located downstream from the entrance roller pair 146 in the sheet conveyance direction. Further, the sheet laminator 400 performs the post-processing operations including the stapling operation, on the sheet Pp on which the sheet laminating operation is not performed. The sheet Pp after the sheet laminating operation is ejected to a sheet ejection tray 150 included in the sheet laminator 400.

As illustrated in FIG. 3, the sheet laminator 100 included in the image forming system 1 is provided with a sheet processing passage and a sheet ejection passage. The sheet processing passage serves as a first sheet conveyance passage in which the sheet is conveyed for the post-processing operation (the sheet laminating operation). The sheet ejection passage serves as a second sheet conveyance passage in which the sheet does not receive the sheet laminating operation and is conveyed to the downstream part of the image forming system 1. In FIG. 3, the sheet processing passage serving as a first sheet conveyance passage is disposed below a branching portion of the first sheet conveyance passage and the second sheet conveyance passage. The sheet ejection passage serving as a second sheet conveyance passage is disposed on the left from the branching portion in FIG. 3. In addition to these passages, the configuration of system control is provided that enables execution of a print job in which the sheet laminating operation is not performed during a print job in which the sheet laminating operation is performed. Thus, the time of the sheet laminating operation can be effectively utilized, thus enhancing the productivity of the entire system. The sheet tray 102 is provided with a plurality of sensors C10 that detect the size of the sheet Ps.

Control Block

Figure 4:
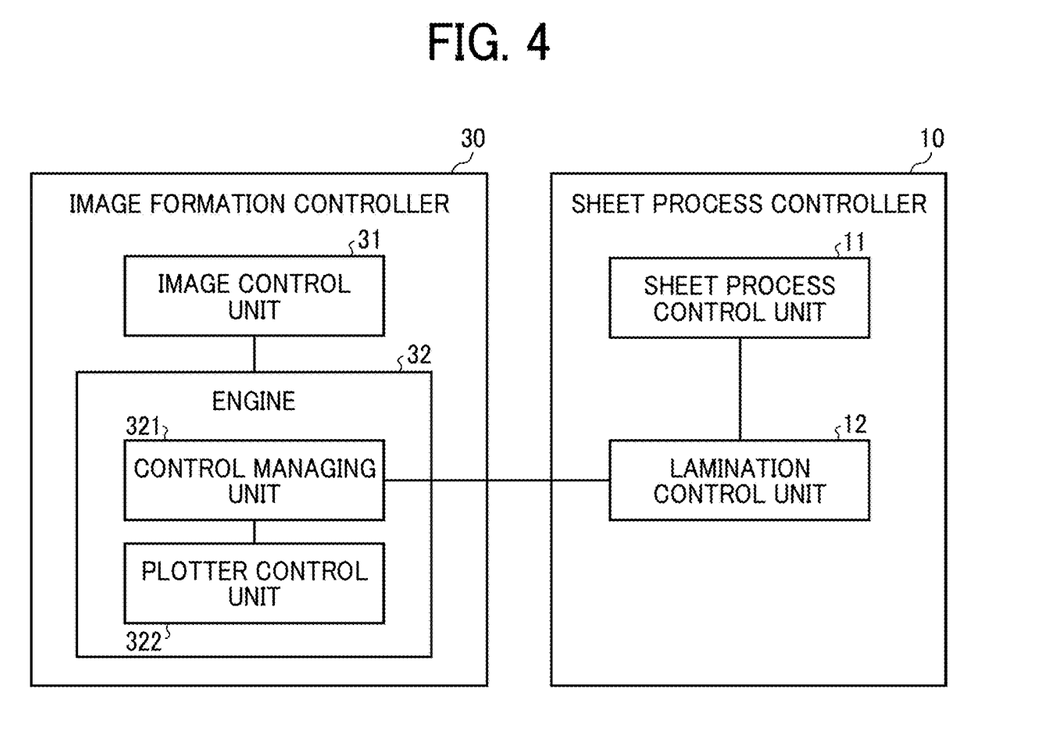
FIG. 4 is a functional block diagram illustrating a controller according to an embodiment of the present disclosure.

A description is given of the controller that controls the operation of the image forming system 1, with reference to FIG. 4.

FIG. 4 is a functional block diagram illustrating the controller according to an embodiment of the present disclosure.

As illustrated in FIG. 4, the image forming system 1 includes an image formation controller 30 serving as a control block of the image forming apparatus 300 and a sheet process controller 10 serving as a control block of the sheet laminator 100. The image formation controller 30 and the sheet process controller 10 communicate with each other.

The image formation controller 30 includes an image control unit 31 and an engine 32. The sheet process controller 10 includes a sheet process control unit 11 and a lamination control unit 12.

The image control unit 31 receives a print request from a user, and then sends the print request to a control management unit 321 included in the engine 32. The control management unit 321 requests a plotter control unit 322 and a lamination control unit 12 to control each requested page. In response to the request from the control management unit 321, the plotter control unit 322 controls the process for forming an image and ejecting the sheet Ps when the sheet Ps is fed and conveyed.

The lamination control unit 12 starts the sheet separating operation as preparation for integrating the two-ply sheet S with the inner sheet P contained in the two-ply sheet PJ and controls the sheet laminating operation as a process for combining the inner sheet P conveyed from the image forming apparatus 300 and the two-ply sheet S.

The sheet process control unit 11 controls conveyance of the inner sheets P including control for execution of the sheet laminating operation by the lamination control unit 12.

In the image forming system 1 according to the present embodiment, abnormal condition may be caused for any reason during a print job in the image forming apparatus 300 and result in interruption of the operation of the image forming apparatus 300. Even in such a case, the image forming system 1 according to the present embodiment holds the two-ply sheet S under preparation for the sheet processing in the sheet laminator 100. The two-ply sheet S held in the sheet laminator 100 is controlled to be usable for the sheet laminating operation in the recovery printing after the abnormal condition of the image forming apparatus 300 is removed. A series of these controls is achieved by cooperation between the control management unit 321 and the lamination control unit 12. The phrase "(the image forming system 1 according to the present embodiment) holds the two-ply sheet S indicates that the two-ply sheet S, which has been prepared to be used if the operation of the image forming apparatus 300 is normal, is not discarded due to interruption of the operation of the image forming apparatus 300 but is maintained to be usable when the operation of the image forming apparatus 300 is started again.

First Embodiment of Image Formation Process Flow with Sheet Processing

Descriptions are given of the flow of image forming operation performed in the image forming system 1 according to the present embodiment. First, a description is given of a known sheet processing method and the issues of the known sheet processing method, with reference to the flowchart of FIG. 5.

Figure 5:
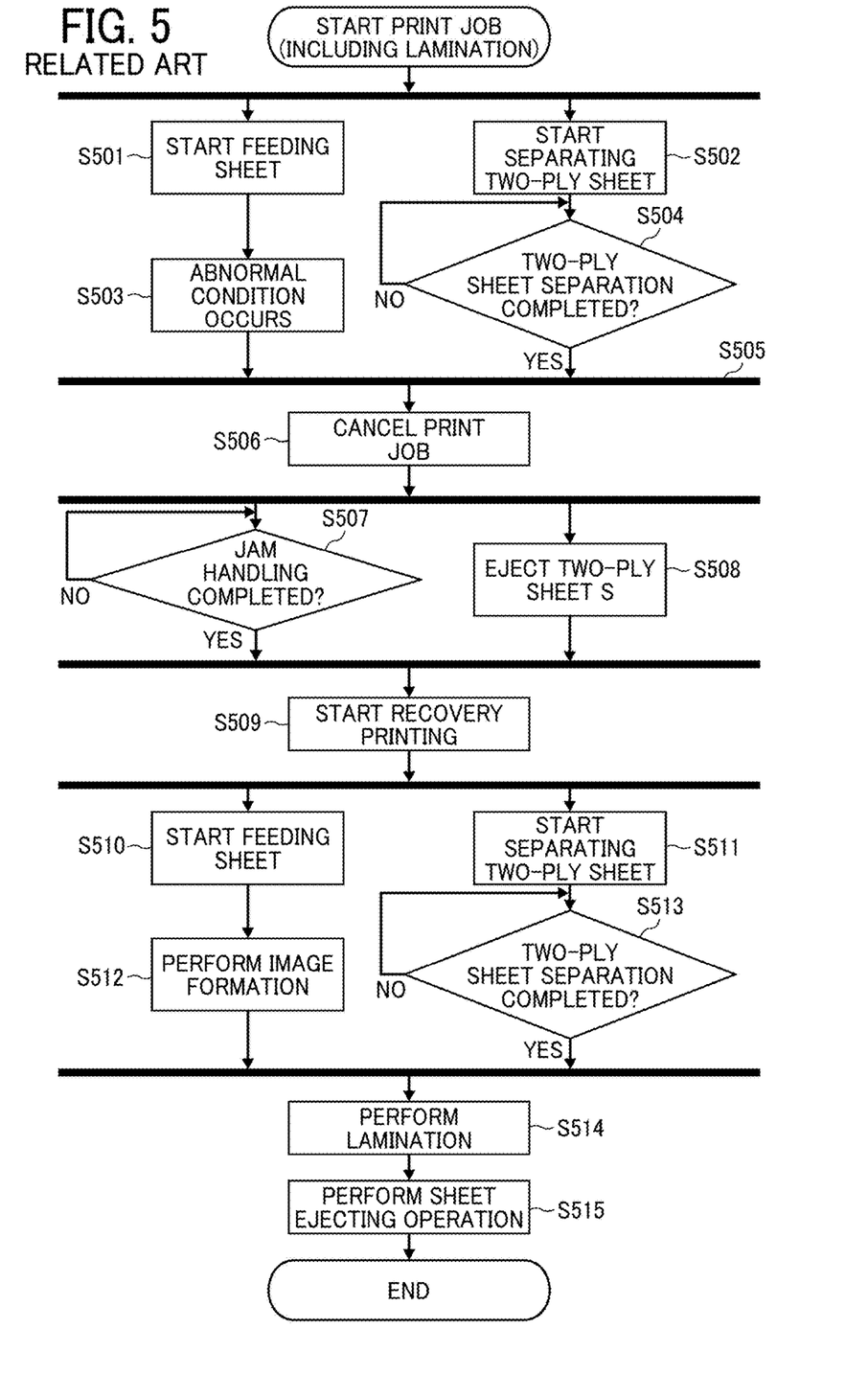
FIG. 5 is a flowchart of a known printing process including lamination.

FIG. 5 is the flowchart of a known printing process including lamination.

In the known sheet processing method, as the print job including lamination starts, the image forming apparatus 300 starts feeding the sheet Ps under the control of the image control unit 31 (step S501). At the same time, the sheet laminator 100 starts separating the two-ply sheet S under the control of the lamination control unit 12, based on the request from the control management unit 321 (step S502).

If abnormal condition (e.g., paper jam) occurs in the image forming apparatus 300 (step S503), the image forming apparatus 300 temporarily stops the operation (step S505). On the other hand, the sheet laminator 100 continuously performs the sheet separating operation on the two-ply sheet S and the sheet process controller 10 controlling the sheet laminator 100 determines whether the sheet separating operation on the two-ply sheet S is completed (step S504). When the sheet separating operation on the two-ply sheet S is not completed (NO in step S504), step S504 is repeated until the sheet separating operation on the two-ply sheet S is completed. When the sheet separating operation on the two-ply sheet S is completed (YES in step S504), the sheet laminator 100 temporarily stops the operation (step S505).

The image forming system 1 execute cancellation of the print job due to the abnormal condition of the image forming apparatus 300 (step S506).

After step S506, the image formation controller 30 controlling the image forming apparatus 300 determines whether removal of the abnormal condition (the paper jam handling) is completed (step S507). When the removal of the abnormal condition is not completed (NO in step S507), step S507 is looped (repeated) until the abnormal condition is completely removed. In step S507, in other words, while the removal of the paper jam (i.e., the abnormal condition) in the image forming apparatus 300 is looped (NO in step S507), the sheet laminator 100 performs a sheet ejecting operation to eject the two-ply sheet S in which the two sheets are separated, to a purge tray (i.e., the sheet ejection tray 104) (step S508).

When the removal of the abnormal condition (paper jam) in the image forming apparatus 300 is completed (YES in step S507), the image forming system 1 start a recovery printing (step S509).

As the recovery printing is started, the image forming apparatus 300 starts feeding the sheet Ps again (step S510) as in step S501 and the sheet laminator 100 starts performing the sheet separating operation on a new the two-ply sheet S (step S511).

After step S510, the image forming apparatus 300 performs the image forming operation on the sheet (step S512). After step S511, the sheet laminator 100 performs the sheet separating operation on the two-ply sheet S and the sheet process controller 10 controlling the sheet laminator 100 determines whether the sheet separating operation on the two-ply sheet S is completed (step S513). When the sheet separating operation on the two-ply sheet S is not completed (NO in step S513), step S513 is repeated until the sheet separating operation on the two-ply sheet S is completed. When the sheet separating operation on the two-ply sheet S is completed (YES in step S513), the sheet laminator 100 causes the inner sheet P to be inserted into the two-ply sheet S, in other words, between the two sheets separated from each other to perform the sheet laminating operation by application of heat and pressure (S514). After step S514, the two-ply sheet S after the sheet laminating operation is ejected to sheet ejection tray 104 (step S515).

In the known sheet processing method, when any abnormal condition occurs in the image forming apparatus 300, the control management unit 321 requests both the image forming apparatus 300 and the sheet laminator 100 to cancel the operation. Then, the image forming apparatus 300 and the sheet laminator 100 cancel the print job in accordance with the request and eject the two-two-ply sheet S as a post-processing member.

As soon as removal of the abnormal condition in the image forming apparatus 300 and ejection of the post-processing member (i.e., the two-ply sheet S) are completed, the control management unit 321 starts the recovery printing for executing the cancelled print job again.

Therefore, in the known sheet processing method illustrated in FIG. 5, when abnormal condition in the image forming apparatus 300 during the preparation of the member (i.e., the two-ply sheet S) to be used for the post-processing operation (i.e., the sheet laminating operation), like the sheet separating operation of the two-ply sheet S in the sheet laminator 100, the two-ply sheet S being prepared for the post-processing operation cannot be used.

Figure 6:
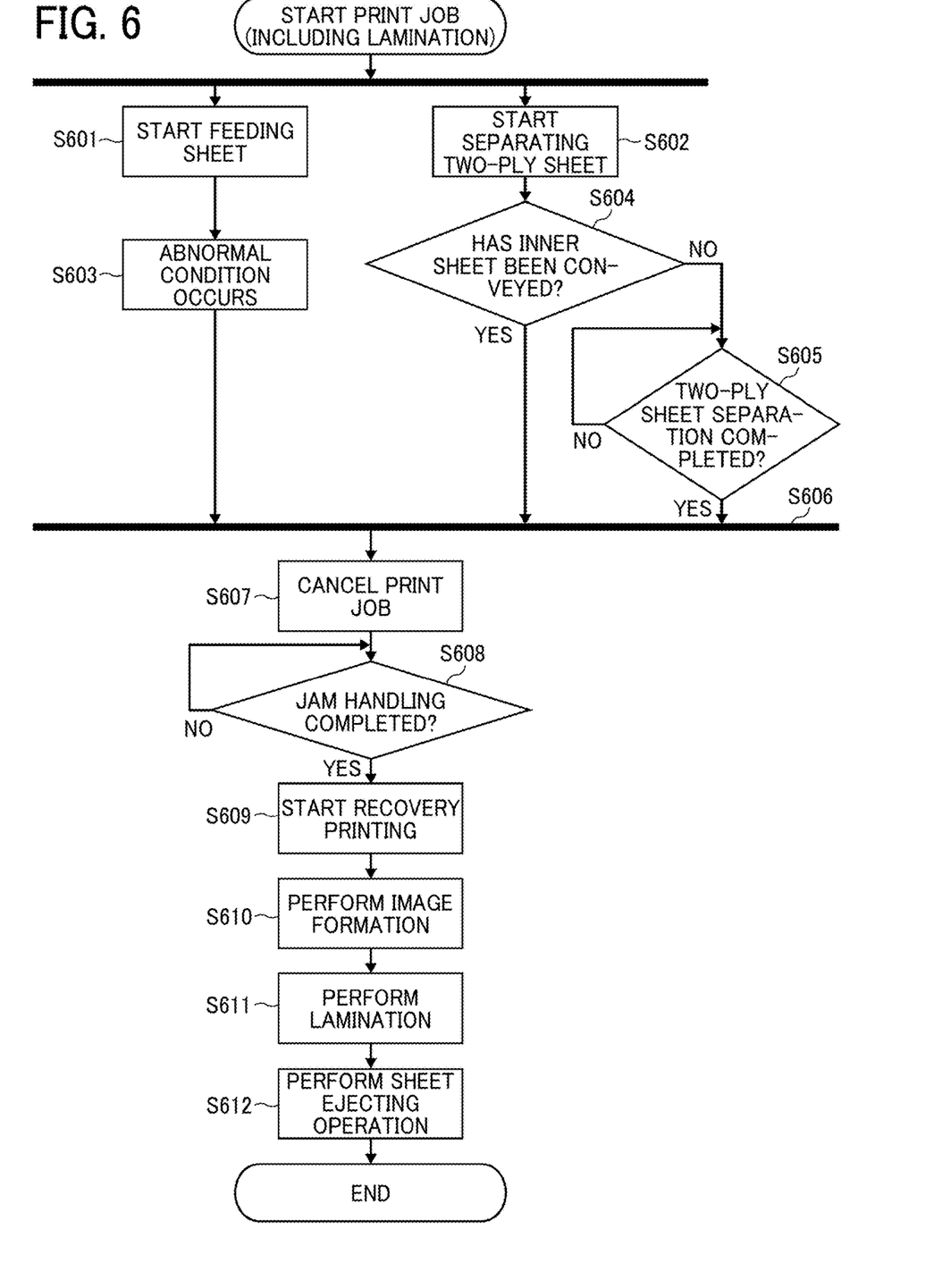
FIG. 6 is a flowchart of a printing process including lamination, according to an embodiment of the present disclosure.

A description is now given of a sheet processing method executed in the image forming system 1 according to an embodiment of the present disclosure, with reference to FIG. 6.

FIG. 6 is a flowchart of a printing process including lamination, according to an embodiment of the present disclosure.

The sheet processing method described below is to eliminate the issues of the known sheet processing method described above.

In the image forming system 1 according to the present embodiment, as the print job including lamination starts, the image forming apparatus 300 starts feeding the sheet Ps (i.e., the sheet feeding operation) under the control of the image control unit 31 (step S601). At the same time, the sheet laminator 100 starts separating the two-ply sheet S (i.e., the sheet separating operation) under the control of the lamination control unit 12, based on the request from the control management unit 321 (step S602).

If abnormal condition (e.g., paper jam) occurs in the image forming apparatus 300 (step S603), the image formation controller 30 causes the image forming apparatus 300 to temporarily stop the operation (step S603).

On the other hand, the sheet laminator 100 continues the sheet separating operation that has been started on the two-ply sheet S. Further, the sheet process controller 10 for controlling the sheet laminator 100 determines whether the inner sheet P has been conveyed from the image forming apparatus 300 to the sheet laminator 100 (step S604). When the inner sheet P has been conveyed from the image forming apparatus 300 to the sheet laminator 100 (YES in step S604), the sheet process controller causes the sheet laminator 100 to temporarily stop the operation (S606). When the inner sheet P has not been conveyed from the image forming apparatus 300 to the sheet laminator 100 (NO in step S604), the sheet process controller 10 for controlling the sheet laminator 100 determines whether the sheet separating operation on the two-ply sheet S is completed (step S605). When the sheet separating operation on the two-ply sheet S is not completed (NO in step S605), step S605 is repeated until the sheet separating operation on the two-ply sheet S is completed. On the other hand, when the sheet separating operation on the two-ply sheet S is completed (YES in step S605), the sheet process controller 10 causes the sheet laminator 100 to temporarily stop the operation (step S606).

Subsequently, the image forming system 1 executes cancellation of the print job caused by the abnormal condition of the image forming apparatus 300 (step S607). At this time, the sheet laminator 100 does not eject the two-ply sheet S in which the two sheets are separated from each other and holds the two-ply sheet S with the two separated sheets. Following the cancellation of the print job in step S607, the image formation controller 30 controlling the image forming apparatus 300 determines whether removal of the abnormal condition (e.g., paper jam) in the image forming apparatus 300 is completed (step S608). When the removal of the abnormal condition (e.g., paper jam) in the image forming apparatus 300 is not completed (NO in step S608), step S608 is looped (repeated) until the removal of the abnormal condition (e.g., paper jam) is completed. When the removal of the abnormal condition (e.g., paper jam) in the image forming apparatus 300 is completed (YES in step S608), the image forming system 1 starts recovery printing (step S609).

When the recovery printing is started (step S609), the image forming apparatus 300 starts feeding the sheet (the sheet feeding operation) again and performs the image forming operation on the sheet Ps (step S610). After step S610, the image forming system 1 resumes (starts again) the processing for using the two-ply sheet S held with the two sheets being separated from each other in the sheet laminator 100, cause the inner sheet P to be inserted into the two-ply sheet S, and perform the sheet laminating operation on the two-ply sheet S containing the inner sheet P by application of heat and pressure (step S611). After step S611, the image forming system 1 ejects the laminated two-ply sheet S (in other words, the two-ply sheet S on which the sheet laminating operation has been performed) to the sheet ejection tray 104 (step S612).

In the above-described image forming system 1 according to the present embodiment, when the abnormal condition occurs in the image forming apparatus 300 before the inner sheet P is conveyed to the sheet laminator 100, the image control unit 31 of the image forming apparatus 300 sends a request of cancellation to the control management unit 321 alone. On the other hand, the sheet laminator 100 continues the operation until completion of the sheet separating operation on the two-ply sheet S. When the sheet separating operation on the two-ply sheet S is completed, the sheet laminator 100 holds the two-ply sheet S. Then, after the removal of the paper jam in the image forming apparatus 300 is completed, the image control unit 31 requests the recovery printing, the output inner sheet P is inserted into the two-ply sheet S standing by in the sheet laminator 100, and the sheet laminator 100 performs the sheet laminating operation.

Each of the following cases described below may be the abnormal condition that occurs in step S603.

In one case, for example, after the print job has started and the sheet separating operation is performed on the two-ply sheet S, the print job with the sheet laminating operation may fall in the abnormal condition in the image forming apparatus 300.

In another case, after the print job has started and the sheet separating operation is performed on the two-ply sheet S, the print job with the sheet laminating operation may fall in the abnormal condition in the sheet laminator 100.

In yet another case, after the print job has started and the sheet separating operation is performed on the two-ply sheet S, when the user opens or closes the cover of the image forming apparatus 300 while the sheet Ps is being conveyed during the print job with the sheet laminating operation, the print job stops as the abnormal condition.

Notification Unit

Figure 7A:
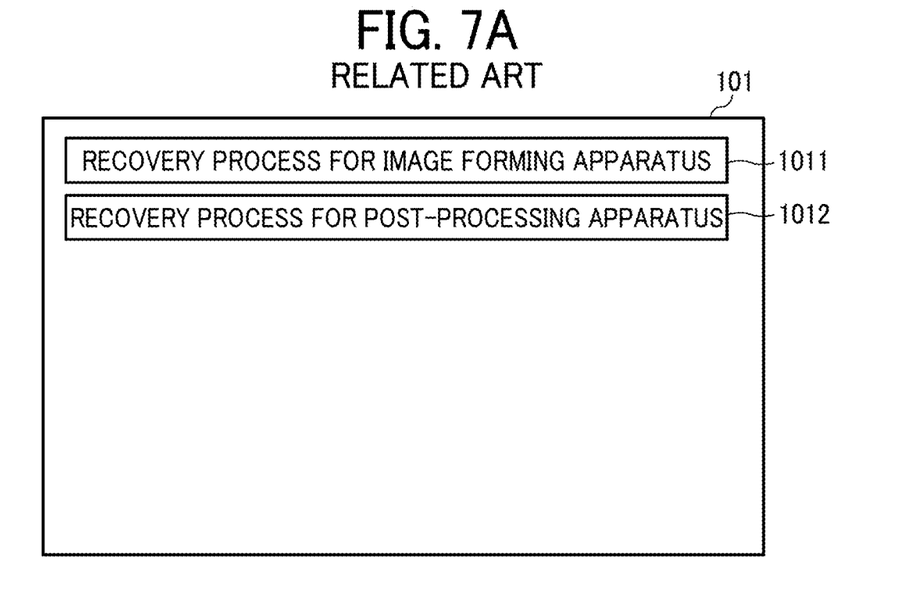
FIG. 7A is a diagram illustrating a notification screen that notifies a user of recovery from the abnormal condition in a known printing process.
Figure 7B:
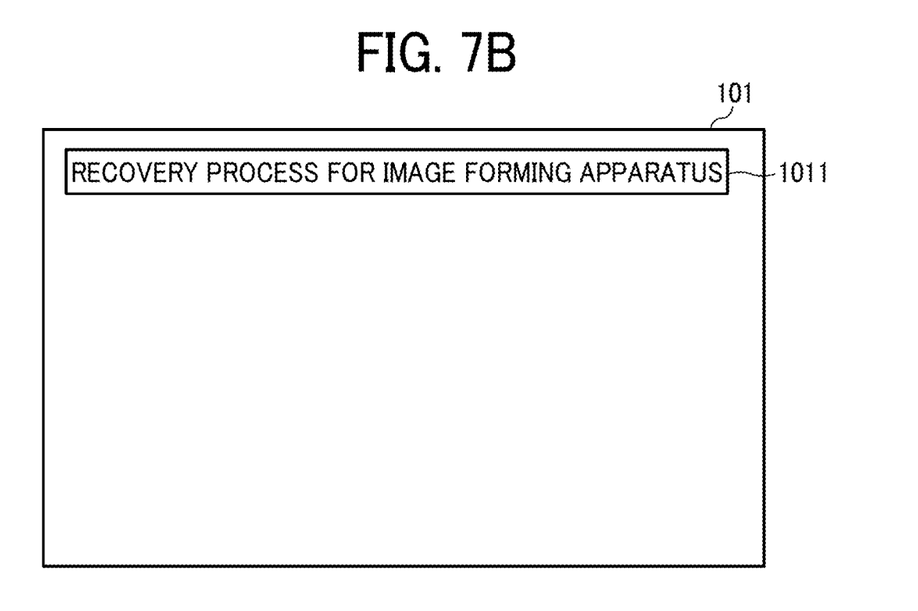
FIG. 7B is a diagram illustrating a notification screen that notifies a user of recovery from abnormal condition in the printing process, according to an embodiment of the present disclosure.

A description is given of the notification unit included in the image forming system 1, with reference to FIGS. 7A and 7B.

FIG. 7A is a diagram illustrating a notification screen displayed on the sheet processing operation panel 101 of the sheet laminator 100 in step S505 in the known sheet processing method.

FIG. 7B is a diagram illustrating a notification screen displayed on the sheet processing operation panel 101 of the sheet laminator 100 in step S606 in the sheet processing method according to the present embodiment.

In the known sheet processing method as illustrated in FIG. 7A, when abnormal condition such as conveyance failure (paper jam) of the sheet Ps occurs in the image forming apparatus 300, the information of a conveyed object (i.e., the sheet Ps and the two-ply sheet S) remaining in the inside (i.e., in the sheet conveyance passage) of the image forming apparatus 300 and the inside (i.e., in the sheet conveyance passage) of the sheet laminator 100 is notified to the sheet process control unit 11. This information of the conveyed object remaining in the image forming apparatus 300 and the sheet laminator 100 is also referred to as remaining object information. The sheet process control unit 11, for example, causes the sheet processing operation panel 101 to display a banner on the sheet processing operation panel 101 based on the remaining object information, thereby being ready to accept an abnormal condition recovery operation for the image forming apparatus 300 and the sheet laminator 100.

For example, in the known sheet processing method, the controller causes the sheet processing operation panel 101 to display a button 1011 for the recovery process for the image forming apparatus 300 indicating "RECOVERY PROCESS FOR IMAGE FORMING APPARATUS" for executing the recovery operation (print job cancellation) of the image forming apparatus 300 and a button 1012 for the recovery process for the sheet laminator 100 indicating "RECOVERY PROCESS FOR POST-PROCESSING APPARATUS" for canceling the operation of the sheet laminator 100 to notify a user of the abnormal condition such as paper jam. In this case, if the sheet separating operation is performed on the two-ply sheet S and the separated two-ply sheet S remains in the sheet laminator 100, the button 1012 for recovery process for the sheet laminator 100 is displayed. Accordingly, unless both the button 1011 for recovery process for the image forming apparatus 300 and the button 1012 for recovery process for the sheet laminator 100 are operated, the recovery process (i.e., cancellation of the print job in step S506) is not executed.

On the other hand, in the sheet processing method according to the present embodiment as illustrated in FIG. 7B, when abnormal condition such as conveyance failure (paper jam) of the sheet Ps occurs in the image forming apparatus 300, the information of a conveyed object (i.e., the sheet Ps and the two-ply sheet S) remaining in the inside (i.e., in the sheet conveyance passage) of the image forming apparatus 300 and the inside (i.e., in the sheet conveyance passage) of the sheet laminator 100 is notified to the sheet process control unit 11. As described above, this information of the conveyed object remaining in the image forming apparatus 300 and the sheet laminator 100 is also referred to as remaining object information. The sheet process control unit 11, for example, causes the sheet processing operation panel 101 to display a banner on the screen based on the remaining object information, thereby being ready to accept an abnormal condition recovery operation for the image forming apparatus 300 and the sheet laminator 100.

In the processing method according to the present embodiment, only the button 1011 for recovery process for the image forming apparatus 300 indicating "RECOVERY PROCESS FOR IMAGE FORMING APPARATUS" as the recovery prompting information is notified (output) to prompt the user to execute the recovery operation (print job cancellation) of the image forming apparatus 300. In other words, even when the two-ply sheet S that has already received the sheet separating operation remains inside the sheet laminator 100, the button 1012 for the recovery process for the sheet laminator 100 indicating "RECOVERY PROCESS FOR POST-PROCESSING APPARATUS" for canceling the operation of the sheet laminator 100 is not displayed. When the button 1011 for the recovery process for the image forming apparatus 300 indicating "RECOVERY PROCESS FOR IMAGE FORMING APPARATUS" is pressed for the operation, the recovery process is executed (step S607).

Due to such a configuration, in the image forming system 1 according to the present embodiment, cancellation of the operation of the sheet laminator 100 is not prompted and the recovery process is not required. As a result, if the user requests execution of the abnormal condition recovery operation for the image forming apparatus 300 only, the two-ply sheet S that has already been standing by can be reused at the start of the recovery printing.

Second Embodiment of Image Formation Process Flow with Sheet Processing

Figure 8:
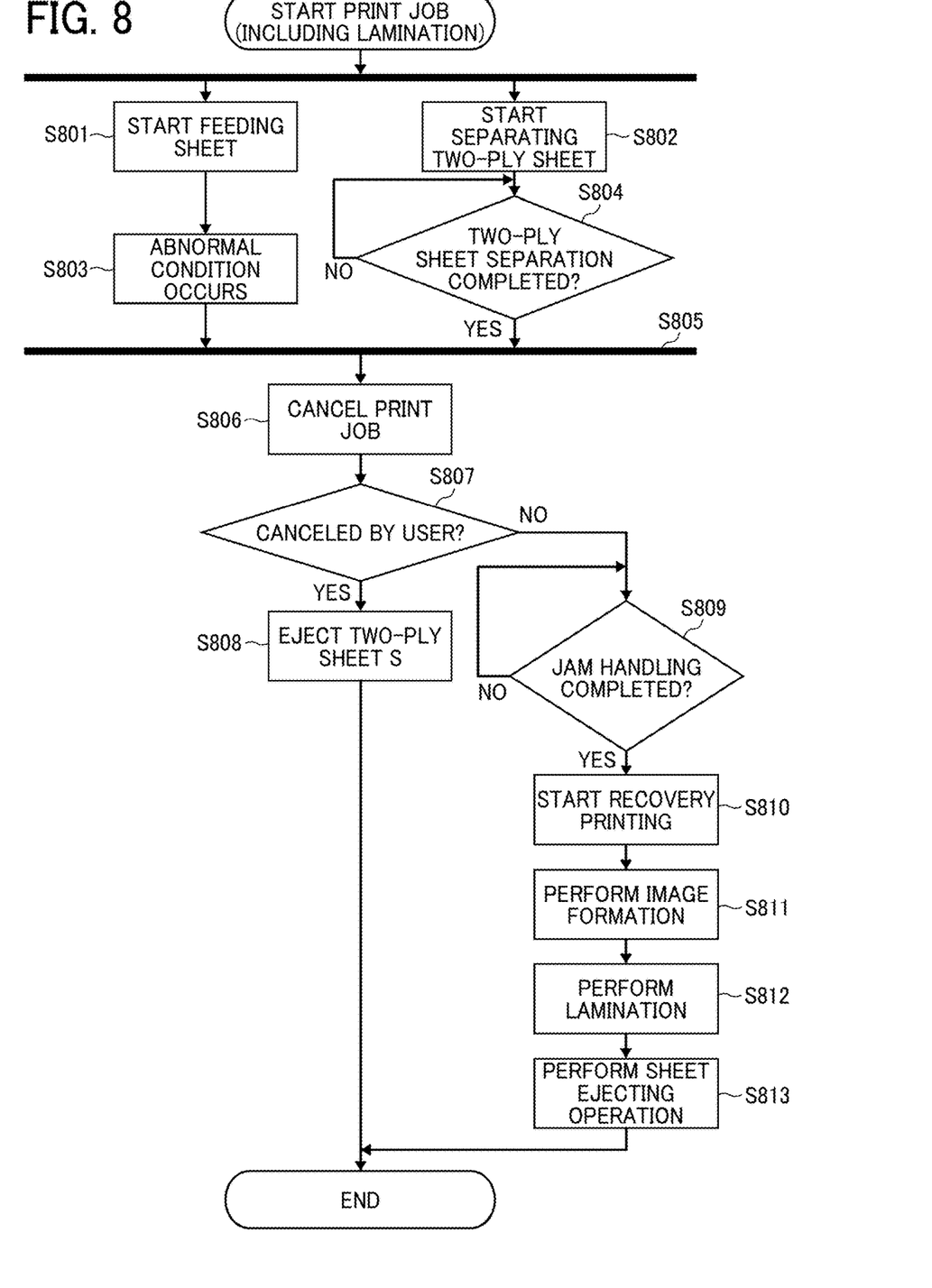
FIG. 8 is a flowchart of another printing process including lamination, according to an embodiment of the present disclosure.

A description is now given of the flow of image forming operation performed in the image forming system 1 according to the second embodiment of the present disclosure.

FIG. 8 is a flowchart of another printing process including lamination, according to the second embodiment of the present disclosure.

As described in the first embodiment, not only recovery printing is executed after recovery from the abnormal condition but also a print job itself may be canceled by the operation by a user. In this case, the recovery printing is not started.

Like the first embodiment, in the image forming system 1 according to the present embodiment (i.e., the second embodiment), as the print job including lamination starts, the image forming apparatus 300 starts feeding the sheet Ps (i.e., the sheet feeding operation) under the control of the image control unit 31 (step S801). At the same time, the sheet laminator 100 starts separating the two-ply sheet S (i.e., the sheet separating operation) under the control of the lamination control unit 12, based on the request from the control management unit 321 (step S802).

If abnormal condition (e.g., paper jam) occurs in the image forming apparatus 300 (step S803), the image formation controller 30 causes the image forming apparatus 300 to temporarily stop the operation (step S803). On the other hand, the sheet laminator 100 continuously performs the sheet separating operation on the two-ply sheet S and the sheet process controller 10 controlling the sheet laminator 100 determines whether the sheet separating operation on the two-ply sheet S is completed (step S804). When the sheet separating operation on the two-ply sheet S is not completed (NO in step S804), step S804 is repeated until the sheet separating operation on the two-ply sheet S is completed. When the sheet separating operation on the two-ply sheet S is completed (YES in step S804), the sheet process controller 10 causes the sheet laminator 100 temporarily to temporarily stop the operation (step S805).

The image forming system 1 execute cancellation of the print job due to the abnormal condition of the image forming apparatus 300 (step S806).

After step S806, the image forming apparatus 300 perform removal of the abnormal condition (i.e., paper jam) and the image formation controller 30 controlling the image forming apparatus 300 determines whether the operation is canceled by the user (step S807). If the user cancels the operation performed in the image forming apparatus 300 before the operation is completed (YES in step S807), the sheet laminator 100 performs a sheet ejecting operation to eject the two-ply sheet S in which the two sheets are separated, to a purge tray (i.e., the sheet ejection tray 104) based on the process stop instruction (cancellation instruction) (step S808).

When the user does not cancel the operation performed in the image forming apparatus 300 before the operation is completed (NO in step S807), the image formation controller 30 controlling the image forming apparatus 300 determines whether removal of the abnormal condition, in other words, the paper jam handling is completed in the image forming apparatus 300 (step S809). When the paper jam handling is not completed in the image forming apparatus 300 (NO in step S809), step S809 is looped (repeated) until the paper jam handling is completed in the image forming apparatus 300. When the paper jam handling is completed (YES in step S809, the image forming system 1 starts recovery printing (step S810).

As the recovery printing is started in step S810, the image forming apparatus 300 starts feeding the sheet (the sheet feeding operation) again and performs the image forming operation on the sheet Ps (step S811). After step S811, the image forming system 1 starts the processing for using the two-ply sheet S held with the two sheets being separated from each other in the sheet laminator 100, causes the inner sheet P to be inserted into the two-ply sheet S, and performs the sheet laminating operation on the two-ply sheet S containing the inner sheet P by application of heat and pressure (step S812). After step S812, the image forming system 1 ejects the laminated two-ply sheet S (in other words, the two-ply sheet S on which the sheet laminating operation has been performed) to the sheet ejection tray 104 (step S813).

As described above, according to the process flow according to the present embodiment, it is possible to provide a step in which the recovery process (recovery operation) from the abnormal condition that has occurred after the start of the print job is performed and then the user determines whether or not the prepared two-ply sheet S can be used. In this case, if the user determines that reuse of the two-ply sheet S is not appropriate, the user cancels the recovery process. By so doing, the two-ply sheet S is ejected and the print job using a new two-ply sheet S can be executed. In other words, when the sheet separating operation performed by the sheet laminator 100 is interrupted due to the abnormal condition based on the process stop instruction (cancellation instruction) to, for example, the image forming apparatus 300, the sheet laminator 100 does not resume the interrupted sheet separating operation on the currently processed two-ply sheet S and perform the sheet separating operation from the beginning on a new two-ply sheet S.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus comprising:
   a sheet entrance portion configured to receive a sheet medium conveyed from an upstream apparatus; and
   a post-processing device including a separation member and a thermal pressure member, the post-processing device configured to separate a two-ply sheet by the separation member to insert the sheet medium into the two-ply sheet, and perform a heating operation by the thermal pressure member on the two-ply sheet in which the sheet medium is inserted; and
   circuitry configured to cause the post-processing device to:
   interrupt a post-processing operation, as one of a series of post-processing operations up to the heating operation, in response to an occurrence of an abnormal condition of the upstream apparatus; and resume the post-processing operation interrupted due to the abnormal condition of the upstream apparatus, in response to a recovery from the abnormal condition of the upstream apparatus.

2. The sheet processing apparatus according to claim 1, wherein, when the post-processing operation interrupted due to the abnormal condition of the upstream apparatus is a sheet separating operation on the two-ply sheet, the circuitry causes the post-processing device to resume the sheet separating operation in response to the recovery from the abnormal condition of the upstream apparatus.

3. The sheet processing apparatus according to claim 2, wherein, when the post-processing operation interrupted due to the abnormal condition of the upstream apparatus is resumed, the circuitry causes the post-processing device to:

insert the sheet medium into the two-ply sheet separated by the sheet separating operation resumed in response to the recovery from the abnormal condition of the upstream apparatus; and execute the heating operation on the two-ply sheet in which the sheet medium is inserted.

4. The sheet processing apparatus according to claim 1, wherein, when the post-processing operation interrupted due to the abnormal condition of the upstream apparatus is a sheet separating operation on the two-ply sheet and the abnormal condition is based on a process stop instruction to the upstream apparatus, the circuitry causes the post-processing device to perform the sheet separating operation from a beginning of the sheet separating operation without resuming the sheet separating operation interrupted due to the abnormal condition of the upstream apparatus.

5. The sheet processing apparatus according to claim 1, wherein, when the abnormal condition occurs in the upstream apparatus before the sheet medium is conveyed into the sheet processing apparatus from the upstream apparatus, the circuitry causes the post-processing device to resume the post-processing operation in response to the recovery from the abnormal condition of the upstream apparatus.

6. The sheet processing apparatus according to claim 1, wherein, when the abnormal condition occurs in the upstream apparatus, the circuitry causes the post-processing device to output recovery prompting information to prompt a user to execute a recovery operation of the abnormal condition of the upstream apparatus.

7. An image forming apparatus comprising:

a printer configured to form an image on a sheet; and the sheet processing apparatus according to claim 1, attached to the image forming apparatus and configured to perform a post-processing operation on the sheet.

8. An image forming system comprising:

an image forming apparatus including a printer configured to form an image on a sheet medium; and the sheet processing apparatus according to claim 1, attached to the image forming apparatus and configured to perform a post-processing operation on the sheet medium.

\* \* \* \* \*